United States Patent

McCain et al.

(10) Patent No.: US 7,472,174 B2
(45) Date of Patent: Dec. 30, 2008

(54) ABSTRACT MECHANISM FOR CONSTRUCTING COMMANDS FOR THE COMMAND PATTERN

(75) Inventors: Brian S. McCain, Tucson, AZ (US); Jason L. Peipelman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 11/037,863

(22) Filed: Jan. 18, 2005

(65) Prior Publication Data

US 2006/0161618 A1 Jul. 20, 2006

(51) Int. Cl.
*G06F 15/16* (2006.01)

(52) U.S. Cl. ............... 709/219; 709/217; 709/218; 709/225; 709/226; 709/230; 709/236

(58) Field of Classification Search ......... 709/217–219, 709/225–226, 230, 236
See application file for complete search history.

(56) References Cited

U.S. PATENT DOCUMENTS

| | | | |
|---|---|---|---|
| 5,642,515 A | 6/1997 | Jones et al. | |
| 5,926,549 A | 7/1999 | Pinkas | |
| 6,021,445 A | 2/2000 | Chapa | |
| 6,044,367 A | 3/2000 | Wolff | |
| 6,044,409 A * | 3/2000 | Lim et al. | .................. 719/315 |
| 6,085,223 A | 7/2000 | Carino et al. | |
| 6,201,996 B1 | 3/2001 | Crater et al. | |
| 6,434,594 B1 | 8/2002 | Wesemann et al. | |
| 6,457,176 B1 | 9/2002 | King | |
| 6,487,577 B1 | 11/2002 | Sundararajan | |
| 6,490,623 B1 | 12/2002 | Wesley | |
| 6,581,102 B1 | 6/2003 | Amini et al. | |
| 6,728,711 B2 * | 4/2004 | Richard | ......................... 707/9 |
| 6,832,239 B1 | 12/2004 | Kraft et al. | |
| 6,873,988 B2 | 3/2005 | Herrmann et al. | |
| 7,111,065 B2 * | 9/2006 | Davidson et al. | ............ 709/227 |
| 7,114,083 B2 * | 9/2006 | Devine et al. | ............... 713/152 |
| 7,143,359 B2 * | 11/2006 | Aggarwal et al. | ........... 715/760 |

* cited by examiner

*Primary Examiner*—Liangche A Wang
(74) *Attorney, Agent, or Firm*—Scully, Scott, Murphy & Presser, P.C.

(57) ABSTRACT

The amount of code required to use the command pattern for client-server communications is reduced because, instead of creating separate commands for different actions, instructions required for an action are put into a single, abstract command, along with the required data. The command pattern, an object-oriented design pattern, describes a pattern for encapsulating instructions and data into a single object, called a command. A client application or a dynamic proxy uses the command pattern to encapsulate an identifier of a function to be performed at a server, and first data for use by the server in performing the function, into a command object, and provides the command object to a server host. The server host performs the function by associating instructions with the identifier and executing the instructions, using the first data, to obtain second data, and returns the command object with the second data to the client host.

16 Claims, 3 Drawing Sheets

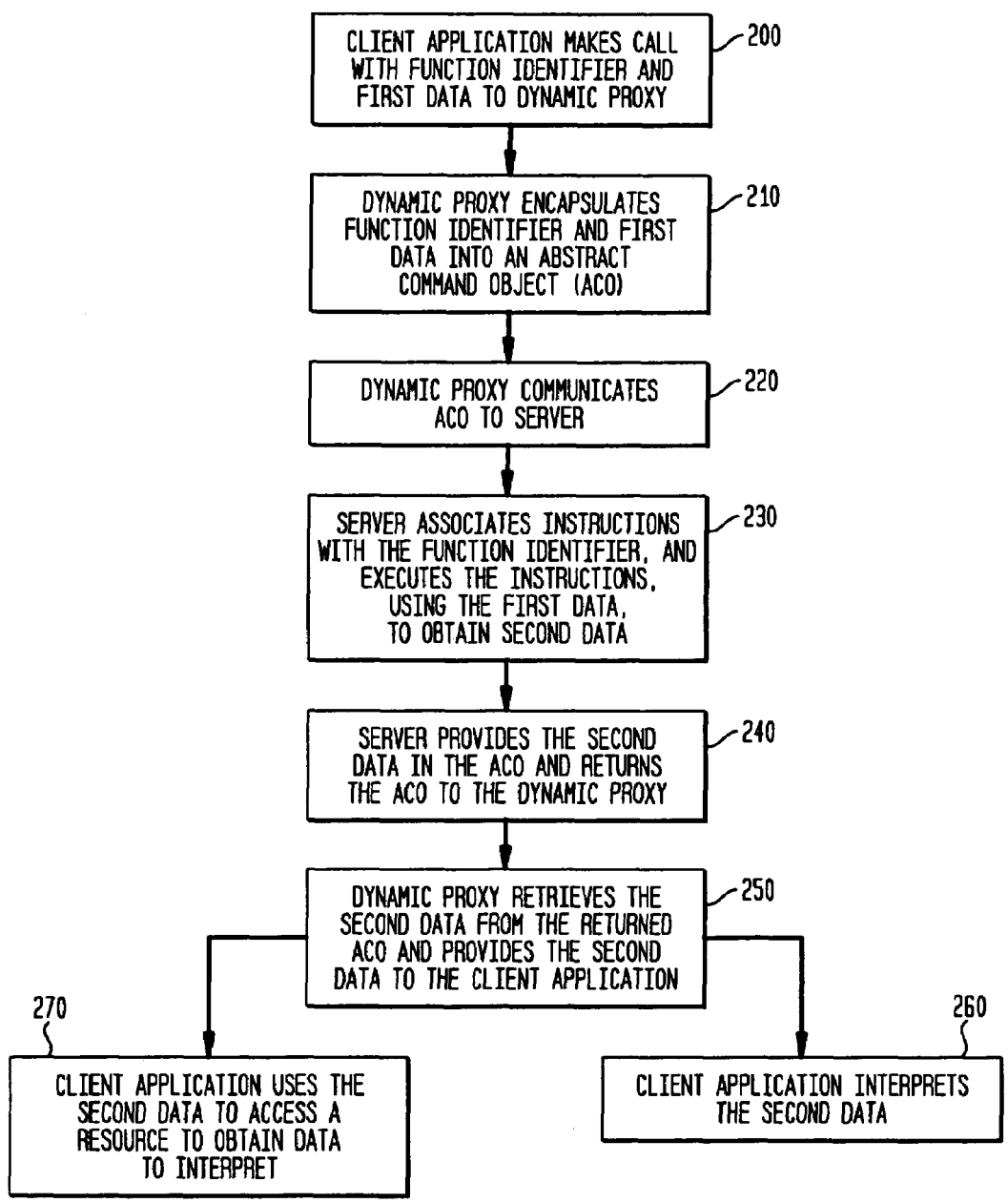

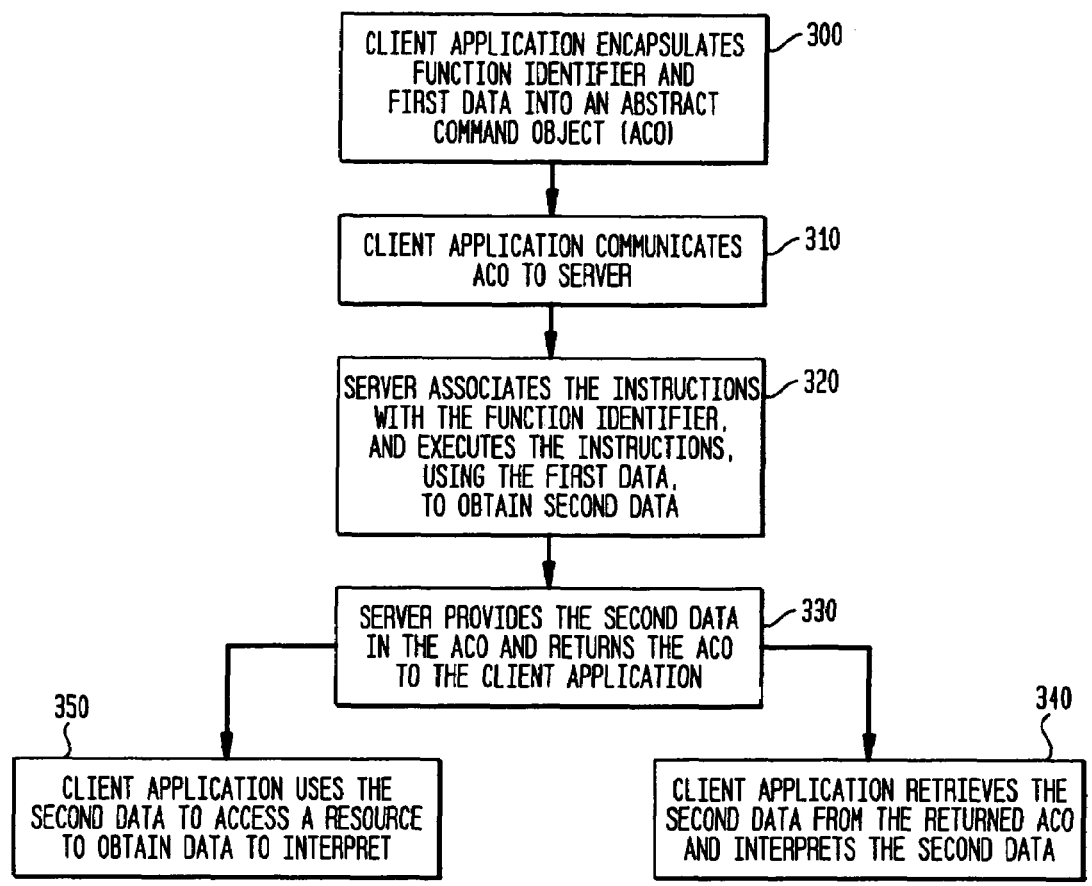

ABSTRACT MECHANISM FOR CONSTRUCTING COMMANDS FOR THE COMMAND PATTERN

CROSS-REFERENCE TO RELATED APPLICATIONS

This application is related to commonly-assigned, co-pending U.S. patent application Ser. No. 10/796,489 to B. McCain et al., entitled "Application Of The Command Pattern To A Client/Server Application", filed Mar. 5, 2004, incorporated herein by reference.

BACKGROUND OF THE INVENTION

1. Field of the Invention

The invention relates generally to the field of data storage in computer systems and, more specifically, to a technique for applying the command pattern to facilitate communication between a client and server.

2. Description of the Related Art

In the standard client/server application design, the client passes first data to the server. The server then interprets the first data, manipulates it to obtain second data, and returns the second data back to the client. The client then interprets that second data. However, this requires all the logic for interpreting and manipulating data to be contained within the server, making the server less flexible when trying to change its functionality. Moreover, the server must also know about all types and versions of clients that can connect to it so it can properly handle the data in ways the different clients will understand. Furthermore, if a new client type is added, the server must be updated by a software update to support the client, and old servers cannot support the new client if they cannot be updated, e.g., due to hardware limitations such as processor speed and memory capacity.

BRIEF SUMMARY OF THE INVENTION

To address these and other issues, the present invention describes a technique for facilitating communication between a client and server using the command pattern. In particular, the present invention reduces the amount of code required to use the command pattern in a large system.

In one aspect, the invention provides a method for use by a client host in providing a networked application with a server host. The method includes providing an identifier of a function to be performed at the server host, providing first data for use by the server host in performing the function, using a command pattern to encapsulate the identifier and the first data into a command object, and communicating the command object to the server host. The server host: (a) performs the function by associating instructions with the identifier and executing the instructions, using the first data, to obtain second data, (b) provides the second data in the command object, and (c) returns the command object with the second data to the client host.

In another aspect, a method for use by a server host in providing a networked application with a client host is provided. The method includes receiving a command object from the client host, wherein a command pattern is used by the client host to encapsulate an identifier of a function to be performed at the server host, and first data for use by the server in performing the function, into the command object, performing the function by associating instructions with the identifier and executing the instructions, using the first data, to obtain second data, providing the second data in the command object, and returning the command object with the second data to the client host.

Related program storage devices and apparatuses may also be provided.

BRIEF DESCRIPTION OF THE DRAWINGS

These and other features, benefits and advantages of the present invention will become apparent by reference to the following text and figures, with like reference numbers referring to like structures across the views, wherein:

FIG. 2 illustrates a method for applying the command pattern to a client/server application, where a dynamic proxy provides an abstract command object; and FIG. 3 illustrates a method for applying the command pattern to a client/server application, where a client application provides an abstract command object.

DETAILED DESCRIPTION OF THE INVENTION

Figure 1:
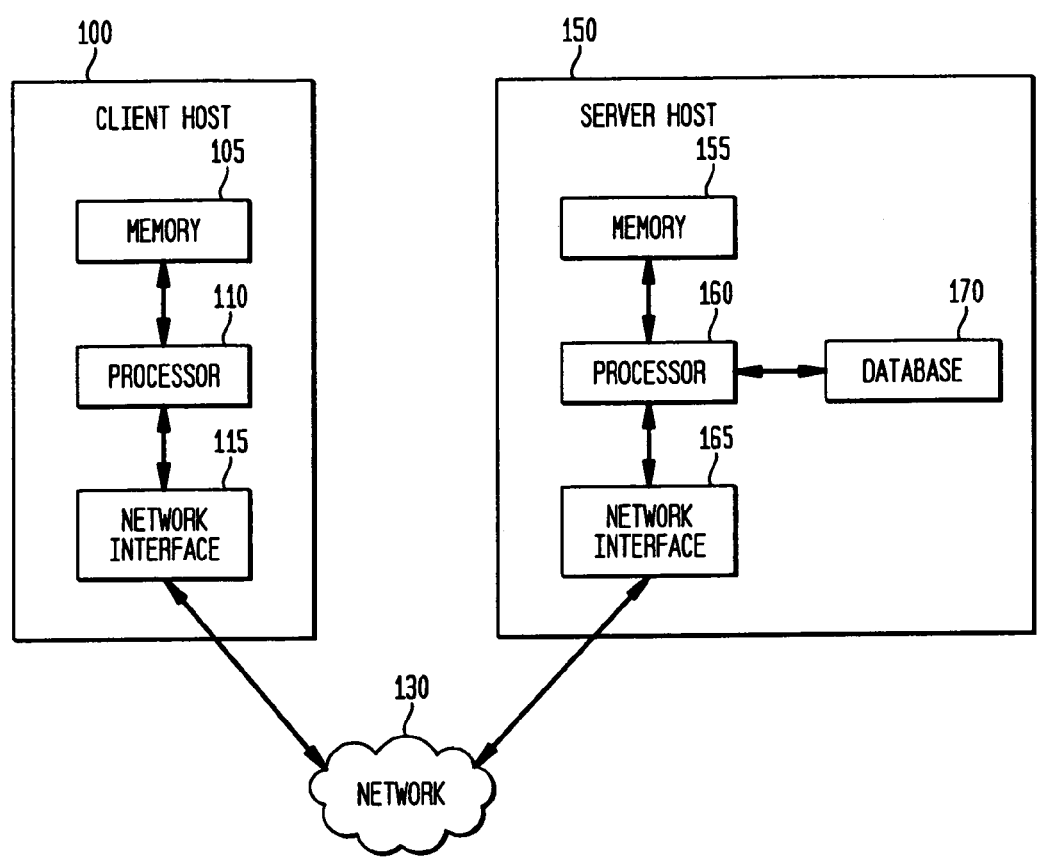
FIG. 1 illustrates a client host and a server host in a computer system.

The present invention is an extension/improvement of the invention described in the above-mentioned U.S. patent application Ser. No. 10/796,489. In particular, the present invention reduces the amount of code required to use the command pattern in a large system. The command pattern is designed to reduce coupling between components of a system, but requires the addition of more commands as the system grows. This can result in huge numbers of objects that must be maintained to support the system.

A core idea of the invention is to reduce the number of command objects required in a system to as little as one object, regardless of the size of the system. This is done by creating an abstract command that can be generated at runtime with the appropriate execution information for the immediate needs of the system. This is an improvement on the command pattern because it reduces the amount of code that must be written, but still provides the same reduced coupling provided by the pattern.

In the implementation of the command pattern discussed in the above-mentioned U.S. patent application Ser. No. 10/796, 489, a new command object is created for each individual action that can occur within a system. Each command object is written with the instructions required to complete its action. A command is created by one component, given data as a parameter, and sent to another component for execution. After execution, the command is sent back to the original component containing the results of the execution.

With the present invention, the commands are designed to take instructions and data. Instead of creating a specific command for a given action, a component creates the instructions required for that action and puts them into the abstract command, along with the required data. The command is then sent to another component for execution. To the second component, the command behaves identically to having multiple command objects. In the Java programming language, this is achieved using the reflection package (java.lang.reflect) to specify the methods the command should execute. Generally, the reflection package enables Java code to discover information about the fields, methods and constructors of loaded classes, and to use reflected fields, methods, and constructors to operate on their underlying counterparts on objects, within security restrictions. The API accommodates applications that need access to either the public members of a target object (based on its runtime class) or the members declared by a given class. The same principles can be applied to other programming languages, though not all languages support this type of functionality.

Thus, a difference between the present invention and the invention discussed in U.S. patent application Ser. No. 10/796,489 is that the present invention can use only one generalized command object instead of many specialized command objects. The mechanism of sending the commands to and from the server, and executing the commands on the server, is not really changed. However, the command itself has changed, with the purpose of making the client-server application more flexible by requiring less code be written to implement new functionality. However, this new technique does not entirely replace the original one or make it obsolete. That is, either approach can be used depending on the situation. For example, one can use the approach described herein when there is a known set of functionality provided by the server, which can be defined in an interface of methods. In this case, the methods are generally single actions that are performed individually against the server. The actions could be in parallel, but each action would not necessarily depend on a different action. On the other hand, one can use the earlier approach when the server provides a large set of methods, where each method performs small actions that can be combined to perform larger actions. In this case, having different commands written that call multiple server methods may be preferable.

The present invention is described in greater detail below.

FIG. 1 illustrates a client host 100 and a server host 150 in a computer system. The client host 100 includes a processor 110, memory 105 and network interface 115, while the server host 150 similarly includes a processor 160, memory 155 and network interface 165. The server host 150 may also include a resource such as a database 170 that may be used as discussed further below. The network interfaces 115 and 165 communicate with one another via a network 130 such as the Internet. For example, the client host 100 may implement a client-side of a distributed or networked application, while the server host 150 may implement a server-side of the application.

The general operation and configuration of the processors 110, 160, memories 105, 155, network interfaces 115, 165, and database 170, is well known in the art and is therefore not described in detail. The components illustrated are provided to assist in understanding the invention. The hosts 100, 150 may be general-purpose computers, workstations, servers, portable devices such as PDAs, or other computer devices. The functionality described herein can be achieved by configuring the hosts 100 and 150 with appropriate software. In one approach, the software comprises an object-oriented software such as Java code that is stored in the memories 105, 155. In this case, the memories 105, 155 are program storage devices. The software is executed using the processors 110, 160 in a known manner.

The invention solves the problem described above by applying the command pattern to the client/server application. The command pattern is an object-oriented design pattern that describes a pattern for encapsulating instructions and data into a single object, called a command. A command can be passed around to different components of a software application, and then executed as needed. Components that receive a command can execute the command without knowledge of the data or the purpose of the command. The command pattern may be applied in a graphical user interface (GUI), for instance. For example, an application might request a user to input their address information as first data at a client host. The application presents a window containing fields for the user to input, such as name, address, state, etc. Once the user has input the data, the user presses a submit button to submit the data. In this application, the command pattern can be used to store that first data. When the submit button is pressed, a submit command can be created. The data input by the user can be placed in the submit command, then the submit command can be sent to another part of the software, such as at a server host, for processing. The other software starts the execution of the command, providing the necessary resources, such as access to a database, for this example. The command then executes its instructions, using the data supplied from the user and the resources provided by the software.

The benefit is that a different command, such as a command to retrieve data from the database, can be executed by the same piece of software that provides access to the database. This can be achieved by sending a command object from the client to the server, instead of just raw data. The command object contains data, as well as the instructions to process the data. When the server receives the command object from the client, it simply executes the command instructions, then returns the command itself back to the client with new data. This encapsulates the new data within the command, and the client can then find the appropriate data for the command it sent. Advantageously, platform-specific instructions need not be used.

Moreover, the server does not need to know anything about the raw data it receives from the client. If a new client type is added, the server does not need modification since the client will still be sending commands that the server can execute. If the data being sent to the server needs to be changed for any reason, the server does not need to be updated to support the new data. The invention allows for flexibility in the client/server application by allowing new client types and versions to be added that can still communicate with old servers. This can be understood by noting that a command is an abstract data type, in this case, an object. The server knows how to process commands, in the abstract sense. It receives a command, executes it (passing any necessary resources in), then sends the command back. A new command can be created that the server never saw before, yet the server can still handle it and process it, even if the server does not know anything about the clients.

A practical example of using the command pattern in a client/server application is in the context of a company phone book application. The application can be a piece of client software that resides on an employee's computer as the client. When an employee wishes to lookup a phone number of a colleague, the employee enters the colleague's name into the local client application. The application then creates a command object with instructions such as "obtain the phone number of an employee", and first data such as the employee's name. The application sends the command object as a request to a centralized database server, which contains all employee phone numbers. The colleague's number is found and returned to the employee making the request. In particular, the server executes the instruction "obtain the phone number of an employee" and processes the first data in the command object to look up the employee's phone number based on the employee's name in the database 170. The server thus processes the first data based on the instructions to provide second data, e.g., the employee's phone number. The employee's phone number is included in the command object and returned to the client. The client then interprets and processes the second data in the returned command object, e.g., by displaying the employee's phone number on a display.

In this example, there are two pieces of software. One is the client application, which allows for user input and displays results, and the other is the server database software, which accepts requests, looks up the information, and sends the results back.

Example pseudo code for this application (using Java syntax) can be as follows.

The first file defines the Command. The class Command can be as follows:

```
public class Command
{
    private Method method;
    private Object[ ] arguments;
    private Object results;
    public Command(Method m, Object[ ] args)
    {
        method = m;
        arguments = args;
    }
    public void execute(ServiceProvider provider)
    {
        results =
method.invoke(provider.getService(method.getDeclaringClass( )),
arguments);
    }
    public Object getResults( )
    {
        return results;
    }
}
```

The ServiceProvider is used to provide certain services that are used to execute particular actions. In this example, the following can be a definition for a service provider that provides a database reference object:

```
public class ServiceProvider
{
    private Hashtable services = new Hashtable( );
    public ServiceProvider(Object[ ] serviceObjects)
    {
        for(int i=0; i<serviceObjects.length; i++)
        {
            services.put(serviceObject[i].getClass( ), serviceObject[i]);
        }
    }
    public Object getService(Class c)
    {
        return services.get(c);
    }
}
```

The server software to process the command can be as follows:

```
public class Server
{
    public static void main(String[ ] args)
    {
        DatabaseRef dbRef = Database.getRef( );
        ServiceProvider provider = new ServiceProvider(new Object[ ]{dbRef});
        ObjectInputStream connection = acceptConnection( );
        ObjectOutputStream output = getOutputStream( );
        Command com = null;
        while((com = (Command)connection.readObject( ))!=null)
        {
            com.execute(provider);
```

-continued

```
            output.writeObject(com);
        }
    }
}
```

The client software can be as follows:

```
public class Client
{
    /**
     * args[0] is the name to lookup.
     */
    public static void main(String[ ] args)
    {
        ObjectOutputStream output = establishConnection( );
        ObjectInputStream input = getInputStream( );
        Class[ ] types = new Class[ ]{String.class};
        Method m =
            DatabaseRef.class.getDeclaredMethod("lookup",
types);
        Object[ ] arguments = new Object[ ]{args[0]};
        Command command = new Command(m, arguments);
        output.writeObject(command);
        command = (Command) input.readObject( );
        System.out.println(command.getResults( ));
    }
}
```

Now, assume that the company wants to allow its employees to update their own phone numbers in the database. They can release second client software for doing updates. Only new client software is required, as the same Command can be used.

A new client application can be written as follows:

```
public class Client2
{
    public static void main(String[ ] args)
    {
        ObjectOutputStream output = establishConnection( );
        ObjectInputStream input = getInputStream( );
        Class[ ] types = new Class[ ]{String.class, String.class};
        Method m =
DatabaseRef.class.getDeclaredMethod("update",types);
        Object[ ] arguments = new Object[ ]{args[0], args[1]};
        Command command = new Command(m, arguments);
        output.writeObject(command);
        command = input.readObject( );
        System.out.println("update successful? " +
command.getResults( ));
    }
}
```

This is the basic way that the invention is used to construct abstract commands. This example works in any object-oriented language. However, in Java there is an easier way to implement the client side where the commands are generated automatically through the use of a dynamic proxy. The dynamic proxy implementation for the two clients above can be as follows.

This interface defines the methods that are available on the server. The DatabaseRef on the server can implement this interface:

```
public interface DatabaseRefInt
{
    public String lookup(String name);
    public boolean update(String name, String phoneNumber);
}
```

This is the invocation handler for the dynamic proxy classes generated for the client. This is used to build commands automatically without requiring knowledge of the purpose of the command:

```
public ServiceInvocationHandler implements InvocationHandler
{
    private ObjectInputStream ois;
    private ObjectOutputStream oos;
    public ServiceInvocationHandler(ObjectInputStream is,
ObjectOutputStream os)
    {
        ois = is;
        oos = os;
    }
    public Object invoke(Object proxy, Method method, Object[ ]
args)
    {
        Command command = new Command(method, args);
        oos.writeObject(command);
        command = (Command) ois.readObject( );
        return command.getResults( );
    }
}
```

The first client above, for doing a lookup, can be rewritten as follows:

```
public class ProxyClient
{
    /**
    * args[0] is the name to lookup.
    */
    public static void main(String[ ] args)
    {
        ObjectOutputStream output = establishConnection( );
        ObjectInputStream input = getInputStream( );
        ServiceInvocationHandler handler = new
ServiceInvocationHandler(input, output);
        DatabaseRefInt dbri = (DatabaseRefInt)
Proxy.newProxyInstance(ProxyClient.class.getClassLoader( ), new
Class[ ]{DatabaseRefInt.class}, handler);
        String phoneNumber = dbri.lookup(args[0]);
        System.out.println(phoneNumber);
    }
}
```

The second client above, for doing an update, can be rewritten as follows:

```
public class ProxyClient2
{
    public static void main(String[ ] args)
    {
        ObjectOutputStream output = establishConnection( );
        ObjectInputStream input = getInputStream( );
        ServiceInvocationHandler handler = new
ServiceInvocationHandler(input, output);
        DatabaseRefInt dbri = (DatabaseRefInt)
Proxy.newProxyInstance(ProxyClient.class.getClassLoader( ), new
Class[ ]{DatabaseRefInt.class}, handler);
```

-continued

```
        boolean successful = dbri.update(args[0], args[1]);
        System.out.println("successful? " + successful);
    }
}
```

With this dynamic implementation, only the interface needs to be updated with new methods, and the client will be able to use them with no new command objects required. This reduces the amount of code needed to implement client functionality.

FIG. 2 illustrates a method for applying the command pattern to a client/server application, where a dynamic proxy provides an abstract command object. This approach is particularly suitable for use with the Java object-oriented language. At block 200, a client application makes call with a function identifier and first data to a dynamic proxy. At block 210, the dynamic proxy encapsulates the function identifier and the first data into an abstract command object (ACO), using the command pattern. At block 220, the dynamic proxy communicates the ACO to a server host. At block 230, the server host associates instructions with the function identifier, and executes the instructions, using the first data, to obtain second data. For example, the server host may store various instructions for performing various functions. The function identifier provided by the client application therefore need only identify the instructions that it wishes the server to execute, where the instructions operate on the first data. Any type of scheme may be used for associating instructions with identifiers at the server. Second data is obtained by executing the instructions using the first data at the server. At block 240, the server provides the second data in the ACO and returns the ACO to the dynamic proxy.

At block 250, the dynamic proxy retrieves the second data from the returned ACO and provides the second data to the client application. Processing then proceeds at either block 260 or block 270. At block 260, the client application interprets the second data. Or, at block 270, the client application uses the second data to access a resource to obtain data to interpret. Blocks 260 and 270 can both be performed as well, in a case where the server provides both data to interpret and data that references a resource, in the ACO.

FIG. 3 illustrates a method for applying the command pattern to a client/server application, where a client application provides an abstract command object. This approach is particularly suitable for use with any object-oriented language. At block 300, the client application encapsulates a function identifier and first data into an abstract command object (ACO). At block 310, the client application communicates the ACO to a server. At block 320, the server associates instructions with the function identifier, and executes the instructions, using the first data, to obtain second data. At block 330, the server provides the second data in the ACO and returns the ACO to the client application. Processing then proceeds at either block 340 or block 350. At block 340, the client application retrieves the second data from the returned ACO and interprets the second data. At block 350, the client application uses the second data to access a resource to obtain data to interpret.

Note that the invention described herein may be deployed on an existing or new computing infrastructure, such as a server or client computing system, by integrating computer-readable code into the computing system, where the code in combination with the computing system is capable of performing a method for achieving the functionality described herein.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for use by a client host in providing a networked application with a sewer host, comprising:
providing an identifier of a function to be performed at the server host, the sewer host storing a plurality of functions each having a unique identifier;
providing first data for use by the sewer host in performing the function;
using a command pattern to encapsulate the identifier and the first data into a command object; and
communicating the command object to the server host;
wherein the server host: (a) executes the function identified by the identifier encapsulated in the command object, using the first data, to obtain second data, (b) provides the second data in the command object, and (c) returns the command object with the second data to the client host,
wherein the sewer host that receives the command object can execute the function without knowledge of a purpose of the function, wherein
a client application at the client host uses the command pattern to encapsulate the identifier and the first data into the command object, and communicates the command object to the sewer host; and
the server host returns the command object with the second data to the client application.

2. The method of claim 1, wherein:
a client application at the client host provides the identifier and the first data in a call to a dynamic proxy; and
the dynamic proxy uses the command pattern to encapsulate the identifier and the first data into the command object, and communicates the command object to the server host.

3. The method of claim 2, wherein:
the server host returns the command object with the second data to the dynamic proxy; and
the dynamic proxy retrieves the second data from the returned command object and provides the retrieved second data to the client application.

4. The method of claim 1, further comprising:
interpreting the second data in the returned command object at a client application at the client host.

5. The method of claim 1, wherein the second data comprises a reference to a resource, the method further comprising:
accessing the resource to obtain data to interpret.

6. At least one program storage device tangibly embodying a program of instructions executable by at least one processor to perform a method for use by a client host in providing a networked application with a server host, the method comprising:
providing an identifier of a function to be performed at the server host, the server host storing a plurality of functions each having a unique identifier;
providing first data for use by the server host in performing the function;
using a command pattern to encapsulate the identifier and the first data into a command object; and
communicating the command object to the server host;
wherein the server host: (a) executes the function identified by the identifier encapsulated in the command object, using the first data, to obtain second data, (b) provides the second data in the command object, and (c) returns the command object with the second data to the client host,
wherein the server host that receives the command object can execute the function without knowledge of a purpose of the function, wherein
a client application at the client host uses the command pattern to encapsulate the identifier and the first data into the command object, and communicates the command object to the server host; and
the server host returns the command object with the second data to the client application.

7. The at least one program storage device of claim 6, wherein:
a client application at the client host provides the identifier and first data in a call to a dynamic proxy, and the dynamic proxy uses the command pattern to encapsulate the identifier and the first data into the command object, and communicates the command object to the server host.

8. The at least one program storage device of claim 7, wherein:
the server host returns the command object with the second data to the dynamic proxy; and
the dynamic proxy retrieves the second data from the returned command object and provides the retrieved second data to the client application.

9. The at least one program storage device of claim 6, wherein the method further comprises:
interpreting the second data in the returned command object at a client application at the client host.

10. The at least one program storage device of claim 6, wherein the second data comprises a reference to a resource, the method further comprising:
using the second data to access the resource to obtain data to interpret.

11. A method for use by a server host in providing a networked application with a client host, comprising:
receiving a command object from the client host;
wherein a command pattern is used by the client host to encapsulate an identifier of a function to be performed at the server host, and first data for use by the server host in performing the function, into the command object, the server host storing a plurality of functions each having a unique identifier;
executing the function identified by the identifier encapsulated in the command object, using the first data, to obtain;
providing the second data in the command object; and
returning the command object with the second data to the client host,
wherein the server host that receives the command object can execute the function without knowledge of a purpose of the function, wherein
a client application at the client host uses the command pattern to encapsulate the identifier and the first data into the command object, and communicates the command object to the server host; and
the server host returns the command object with the second data to the client application.

12. The method of claim 11, wherein:
a client application at the client host provides the identifier and the first data in a call to a dynamic proxy;
the dynamic proxy uses the command pattern to encapsulate the identifier and the first data into the command object, and communicates the command object to the server host;
the server host returns the command object with the second data to the dynamic proxy; and
the dynamic proxy retrieves the second data from the returned command object and provides the retrieved second data to the client application.

13. The method of claim 11, wherein:
a client application at the client host interprets the second data in the returned command object.

14. The method of claim 11, wherein:
the second data comprises a reference to a resource; and
a client application at the client host uses the second data to access the resource to obtain data to interpret.

15. A method for deploying computing infrastructure, comprising integrating computer-readable code into a computing system comprising a client host, where the code in combination with the computing system is capable of providing a networked application with a server host by performing a method comprising:
providing an identifier of a function to be performed at the server host, the server host storing a plurality of functions each having a unique identifier;
providing first data for use by the server host in performing the function;
using a command pattern to encapsulate the identifier and the first data into a command object; and
communicating the command object to the server host;
wherein the server host: (a) executes the function identified by the identifier encapsulated in the command object, using the first data, to obtain second data, (b) provides the second data in the command object, and (c) returns the command object with the second data to the client host,
wherein the sewer host that receives the command object can execute the function without knowledge of a purpose of the function, wherein
a client application at the client host uses the command pattern to encapsulate the identifier and the first data into the command object, and communicates the command object to the sewer host; and
the server host returns the command object with the second data to the client application.

16. A method for deploying computing infrastructure, comprising integrating computer-readable code into a computing system comprising a sewer host, where the code in combination with the computing system is capable of providing a networked application with a client host by performing a method comprising:
receiving a command object from the client host;
wherein a command pattern is used by the client host to encapsulate an identifier of a function to be performed at the sewer host, and first data for use by the sewer host in performing the function, into the command object, the server host storing a plurality of functions each having a unique identifier;
executing the function identified by the identifier encapsulated in the command object, using the first data, to obtain;
providing the second data in the command object; and
returning the command object with the second data to the client host,
wherein the sewer host that receives the command object can execute the function without knowledge of a purpose of the function, wherein
a client application at the client host uses the command pattern to encapsulate the identifier and the first data into the command object, and communicates the command object to the sewer host; and
the server host returns the command object with the second data to the client application.

* * * * *